(12) United States Patent
Huang et al.

(10) Patent No.: US 11,409,936 B2
(45) Date of Patent: Aug. 9, 2022

(54) STANDARD CELL ESTABLISHMENT METHOD

(71) Applicant: NANYA TECHNOLOGY CORPORATION, New Taipei (TW)

(72) Inventors: Jei-Cheng Huang, New Taipei (TW); Tsung-Yu Tsai, New Taipei (TW)

(73) Assignee: NANYA TECHNOLOGY CORPORATION, New Taipei (TW)

( * ) Notice: Subject to any disclaimer, the term of this patent is extended or adjusted under 35 U.S.C. 154(b) by 0 days.

(21) Appl. No.: 16/990,992

(22) Filed: Aug. 11, 2020

(65) Prior Publication Data
US 2022/0050948 A1    Feb. 17, 2022

(51) Int. Cl.
*G06F 30/30* (2020.01)
*G06F 30/392* (2020.01)

(52) U.S. Cl.
CPC .................. *G06F 30/392* (2020.01)

(58) Field of Classification Search
CPC .................................................. G06F 30/392
USPC ........................................................ 716/119
See application file for complete search history.

(56) References Cited

U.S. PATENT DOCUMENTS

| | | | | |
|---|---|---|---|---|
| 4,845,047 A * | 7/1989 | Holloway | ......... | H01L 21/28035 438/289 |
| 6,878,995 B2 * | 4/2005 | Ehwald | ............... | H01L 29/1033 257/335 |
| 9,123,807 B2 | 9/2015 | Ito | | |
| 10,374,052 B2 | 8/2019 | Tan et al. | | |
| 10,527,667 B2 | 1/2020 | Huang et al. | | |
| 2014/0057422 A1 * | 2/2014 | Liu | ................... | H01L 27/11521 438/510 |
| 2019/0088334 A1 * | 3/2019 | Okajima | .............. | G11C 13/003 |

OTHER PUBLICATIONS

Liu, B. (2014). Standard cell library design for sub-threshold operation. Technische Universiteit Eindhoven. https://doi.org/10.6100/IR782367, Jan. 1, 2014 (Year: 2014).*
Ping-Chin Yeh et al., "Improved CV/I Methodology to Accurately Predict CMOS Technology Performance," in IEEE Transactions on Electron Devices, vol. 54, No. 7, pp. 1760-1762, Jul. 2007.

\* cited by examiner

*Primary Examiner* — Jack Chiang
*Assistant Examiner* — Brandon Bowers
(74) *Attorney, Agent, or Firm* — CKC & Partners Co., LLC

(57) ABSTRACT

A standard cell establishment method is disclosed. The standard cell establishment method includes the following operations: setting a first implant split case; obtaining a plurality of characteristic parameters according to the first implant split case; applying the plurality of characteristic parameters to a device delay metric so as to obtain a speed parameter; optimizing a channel parameter if the speed parameter is better than a previous speed parameter; and establishing a standard cell if the channel parameter is optimized successfully.

8 Claims, 1 Drawing Sheet

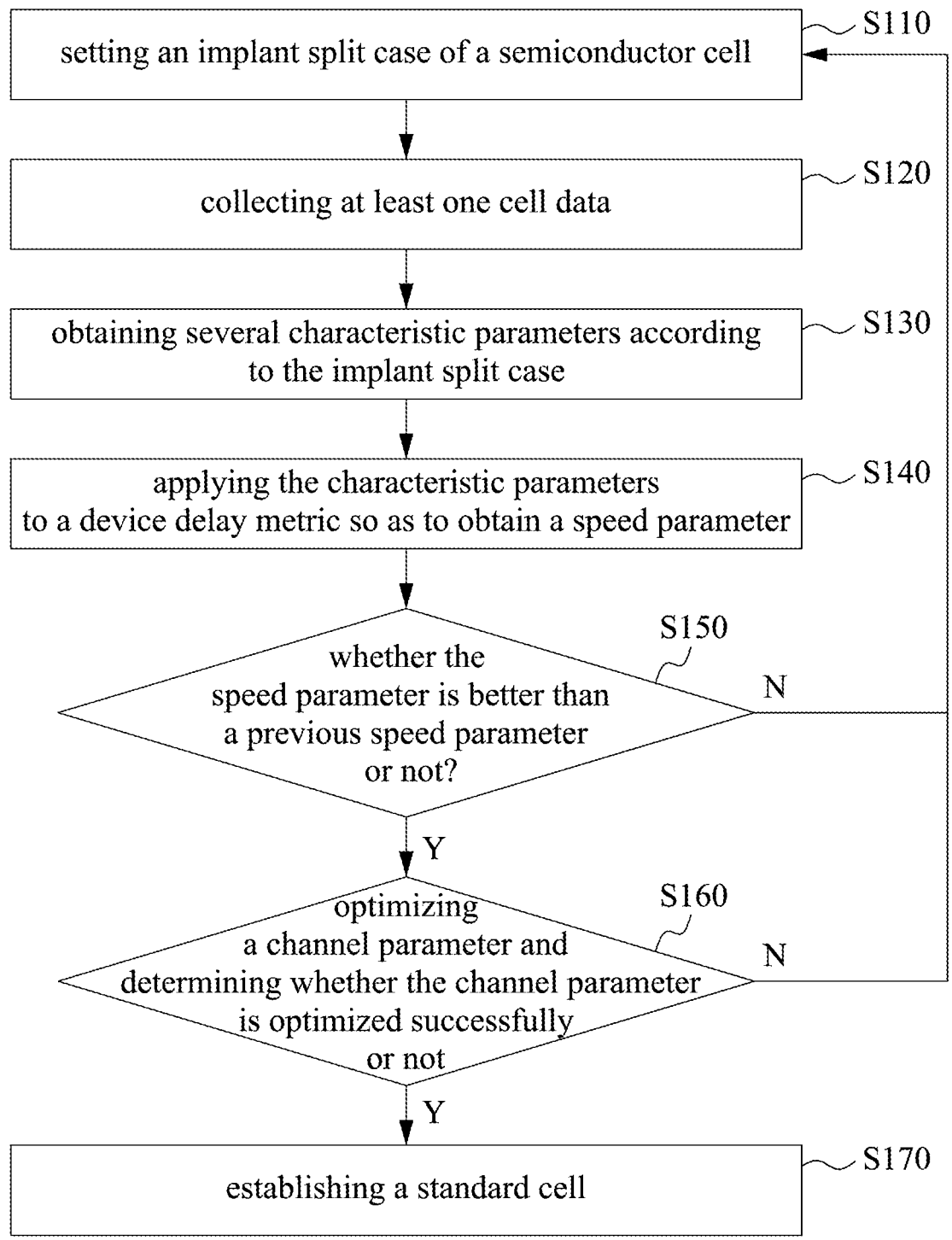

STANDARD CELL ESTABLISHMENT METHOD

BACKGROUND

Technical Field

The present disclosure relates to a standard cell establishment method. More particularly, the present disclosure relates to a standard cell establishment method for optimizing the circuit performance.

Description of Related Art

Currently for time speed (Propagation Delay) consideration, during circuit simulation, checking devices performance based on current process technology is in need. For each new process generation establishment, in order to find the best performance devices for design application, the process of evaluating devices performance well including devices pitch (width/length/space) and all parasitic devices (capacitance/diode/resistance) is in need.

SUMMARY

An aspect of the present disclosure is to provide a standard cell establishment method. The standard cell establishment method includes the following operations: setting a first implant split case; obtaining a plurality of characteristic parameters according to the first implant split case; applying the plurality of characteristic parameters to a device delay metric so as to obtain a speed parameter; optimizing a channel parameter if the speed parameter is better than a previous speed parameter; and establishing a standard cell if the channel parameter is optimized successfully.

In sum, the embodiments of the present disclosure are to provide a standard cell establishment method, so as to evaluate devices performance well including devices pitch (width/length/space) and all parasitic devices (capacitance/diode/resistance) to find the best performance devices for design application. In the embodiments of the present disclosure, different technology application is included and CV/I for generation evolution are applied. It provides an easy way to setup MOSFET database no matter based on Silicon split or TCAD split, and the circuit performance is optimized by propagation delay.

BRIEF DESCRIPTION OF THE DRAWINGS

The present disclosure can be more fully understood by reading the following detailed description of the embodiment, with reference made to the accompanying drawings as follows:

FIG. 1 is a flowchart illustrating a standard cell establishment method in accordance with some embodiments of the present disclosure.

DETAILED DESCRIPTION

In order to make the description of the disclosure more detailed and comprehensive, reference will now be made in detail to the accompanying drawings and the following embodiments. However, the provided embodiments are not used to limit the ranges covered by the present disclosure; orders of step description are not used to limit the execution sequence either. Any devices with equivalent effect through rearrangement are also covered by the present disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

In this document, the term "coupled" may also be termed as "electrically coupled," and the term "connected" may be termed as "electrically connected." "Coupled" and "connected" may also be used to indicate that two or more elements cooperate or interact with each other.

Reference is made to FIG. 1. FIG. 1 is a flowchart 100 illustrating a standard cell establishment method 100 in accordance with some embodiments of the present disclosure. However, the present disclosure is not limited to the embodiment below.

It should be noted that the method can be applied to a system or device having a structure with a processor and a memory.

It should be noted that, in some embodiments, the method may be implemented as a computer program. When the computer program is executed by a computer, an electronic device, or the one or more processor. The computer program can be stored in a non-transitory computer readable medium such as a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this invention pertains.

In addition, it should be noted that in the operations of the following method, no particular sequence is required unless otherwise specified. Moreover, the following operations also may be performed simultaneously or the execution times thereof may at least partially overlap.

Furthermore, the operations of the following method may be added to, replaced, and/or eliminated as appropriate, in accordance with various embodiments of the present disclosure.

Reference is made to FIG. 1. The standard cell establishment method 100 includes the operations below.

In operation S110, an implant split case of a semiconductor cell is set. In some embodiments, the implant split case includes a well split parameter, an S/D split parameter, a LDD split parameter, and/or a halo split parameter.

In operation S120, at least one cell data is collected. In some embodiments, the at least one cell data includes channel length of the semiconductor cell for short channel effect by on/off ratio evaluation.

In operation S130, several characteristic parameters are obtained according to the implant split case. In some embodiments, the implant split case includes a saturation current value and a parasitic capacitance value. In some embodiments, the saturation current value is obtained by operating the semiconductor cell under a direct current (DC) mode. In some embodiments, the parasitic capacitance value is obtained by operating the semiconductor cell under an alternating current (AC) mode.

In some embodiments, the parasitic capacitance is sensitive to the implant split parameters. In some embodiments, the value of CV/I is calculated so as to optimize the saturation current value and the parasitic capacitance value.

In operation S140, the characteristic parameters are applied to a device delay metric so as to obtain a speed parameter. In some embodiments, the device delay metric includes a CV/I methodology. C represents the value of the parasitic capacitance value, I represents the saturation current value, and V represents the voltage value. In some embodiments, in operation S140, device modeling is operated with the parasitic capacitance value and the saturation current value.

In operation S150, whether the speed parameter is better than a previous speed parameter or not is determined. In some embodiments, the previous speed parameter is the speed parameter before setting the implant split case in the operation S110. In some embodiments, the previous speed parameter is the speed parameter of the semiconductor cell established in the last version.

If the speed parameter obtained in operation S140 is better than the previous speed parameter, operation S160 is operated. On the other hand, if the speed parameter obtained in operation S140 is not better than the previous speed parameter, operation S110 is operated. When the speed parameter obtained in operation S140 is not better than the previous speed parameter, another implant split case of the semiconductor cell is set, another at least one cell data is collected, and characteristic parameters according to the new implant split case is obtained.

In operation S160, a channel parameter is optimized and whether the channel parameter is optimized successfully or not is determined. In some embodiments, the channel parameter is WN/WP. WN is the width of the depletion region at the P doped area, and WP is the width of the depletion region at the N doped area. In operation S160, the best WP/WN ratio is confirmed.

If the channel parameter is optimized successfully, operation S170 is operated. On the other hand, if the channel parameter is not optimized successfully, operation S110 is operated. When the channel parameter is not optimized successfully, another implant split case of the semiconductor cell is set, another at least one cell data is collected, and characteristic parameters according to the new implant split case is obtained.

In operation S170, a standard cell is established. In some embodiments, the standard cell is a semiconductor cell such as an inverter, a NAND logic gate, or a Nor logic gate.

In some embodiments, the semiconductor cell is a MOSFET semiconductor cell, and the MOSFET semiconductor cell includes several parasitic capacitances. Part of the parasitic capacitance value is increased when the dosage of the well split and/or the S/D split is shallow or heavier, while some other part of the parasitic capacitance value is increased when the dosage of the LDD split and/or halo split is shallow or heavier. The embodiments or the present disclosure optimizes the performance of the semiconductor cell, and both of the effects of the parasitic capacitance value and the saturation current value are under consideration.

In some embodiments, during different version of the development, the cell data of the semiconductor differs, for example, the channel length is shorter. With the embodiments of the present disclosure, the parasitic capacitance value and the saturation current value may be optimized.

According to the embodiment of the present disclosure, it is understood that the embodiments of the present disclosure are to provide a standard cell establishment method thereof, so as to evaluate devices performance well including devices pitch (width/length/space) and all parasitic devices (capacitance/diode/resistance) to find the best performance devices for design application. In the embodiments of the present disclosure, different technology application is included and CV/I for generation evolution are applied. It provides an easy way to setup MOSFET database no matter based on Silicon split or TCAD split, and the circuit performance is optimized by propagation delay.

Although the present disclosure has been described in considerable detail with reference to certain embodiments thereof, other embodiments are possible. Therefore, the spirit and scope of the appended claims should not be limited to the description of the embodiments contained herein.

In addition, the above illustrations comprise sequential demonstration operations, but the operations need not be performed in the order shown. The execution of the operations in a different order is within the scope of this disclosure. In the spirit and scope of the embodiments of the present disclosure, the operations may be increased, substituted, changed and/or omitted as the case may be.

It will be apparent to those skilled in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A standard cell establishment method, comprising:
    setting a first implant split case;
    obtaining a plurality of first characteristic parameters according to the first implant split case;
    applying the plurality of first characteristic parameters to a device delay metric so as to obtain a first speed parameter;
    optimizing a first channel parameter if the first speed parameter is better than a previous speed parameter of a previous established standard cell;
    establishing a standard cell if the first channel parameter is optimized successfully;
    setting a second implant split case if the first speed parameter is not better than the previous speed parameter or the first channel parameter is not optimized successfully;
    obtaining a plurality of second characteristic parameters according to the second implant split case;
    applying the plurality of second characteristic parameters to a device delay metric so as to obtain a second speed parameter;
    optimizing a second channel parameter if the second speed parameter is better than the previous speed parameter of the previous established standard cell; and
    establishing the standard cell if the second channel parameter is optimized successfully.

2. The standard cell establishment method of claim 1, further comprising:
    collecting at least one cell data after setting the first implant split case.

3. The standard cell establishment method of claim 1, wherein obtaining the plurality of first characteristic parameters according to the first implant split case further comprising:
    obtaining a saturation current value by operating under a DC mode.

4. The standard cell establishment method of claim 1, wherein obtaining the plurality of first characteristic parameters according to the first implant split case further comprises:

obtaining a parasitic capacitance value by operating under an AC mode.

5. The standard cell establishment method of claim 1, wherein the plurality of first characteristic parameters comprise a saturation current value and a parasitic capacitance value.

6. The standard cell establishment method of claim 1, wherein the first speed parameter is obtained by a CV/I metric.

7. The standard cell establishment method of claim 1, wherein the first channel parameter comprises a depletion width ratio.

8. The standard cell establishment method of claim 1, wherein the first implant split case comprises at least one of a well split parameter, an S/D split parameter, a LDD split parameter, and a halo split parameter.

* * * * *